United States Patent
Bunker et al.

(10) Patent No.: US 9,366,184 B2
(45) Date of Patent: *Jun. 14, 2016

(54) GAS TURBINE ENGINE AND METHOD OF OPERATING THEREOF

(71) Applicant: General Electric Company, Schenectady, NY (US)

(72) Inventors: Ronald Scott Bunker, Waterford, NY (US); Andrei Tristan Evulet, Mason, OH (US)

(73) Assignee: General Electric Company, Niskayuna, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/920,244

(22) Filed: Jun. 18, 2013

(65) Prior Publication Data

US 2014/0366550 A1 Dec. 18, 2014

(51) Int. Cl.
  *F02C 7/141* (2006.01)
  *F23R 3/18* (2006.01)
  *F02C 3/10* (2006.01)
  *F23R 3/26* (2006.01)

(52) U.S. Cl.
  CPC . *F02C 7/141* (2013.01); *F02C 3/10* (2013.01); *F23R 3/18* (2013.01); *F23R 3/26* (2013.01); *F23R 2900/03341* (2013.01)

(58) Field of Classification Search
  CPC .... F23R 2900/03341; F23R 3/18; F23R 3/26; F02C 7/141
  USPC .......... 60/774, 39.5, 39.17, 791, 262
  See application file for complete search history.

(56) References Cited

U.S. PATENT DOCUMENTS

| 3,545,202 A | 12/1970 | Richard et al. |
| 3,701,255 A | 10/1972 | Markowski |
| 3,931,707 A * | 1/1976 | Vdoviak ............... F23R 3/20 60/39.826 |
| 4,060,042 A | 11/1977 | Baraldi et al. |
| 4,098,076 A | 7/1978 | Young et al. |
| 4,145,979 A | 3/1979 | Lilley et al. |
| 4,899,539 A | 2/1990 | Gastebois et al. |
| 4,989,407 A | 2/1991 | Grant |
| 6,334,303 B1 | 1/2002 | Berglund et al. |
| 7,568,346 B2 | 8/2009 | Roberts et al. |
| 7,712,315 B2 | 5/2010 | Hautman et al. |
| 7,854,122 B2 | 12/2010 | Steele |

(Continued)

FOREIGN PATENT DOCUMENTS

GB 1355267 A 5/1974

*Primary Examiner* — Phutthiwat Wongwian
*Assistant Examiner* — Marc Amar
(74) *Attorney, Agent, or Firm* — Robert M. McCarthy (57) ABSTRACT

A gas turbine engine and method for operating a gas turbine engine includes compressing an air stream in a compressor and combusting the compressed air stream to generate a post combustion gas. The post combustion gas is expanded in a first turbine. The expanded combustion gas exiting the first turbine is split into a first stream, a second stream and a third stream in a splitting zone including one or more aerodynamically shaped flow diverters. The first stream of the expanded combustion gas is combusted in a reheat combustor. An outer liner and flame stabilizer of the reheat combustor are cooled using the second stream of the expanded combustion gas. An inner liner of the reheat combustor is cooled using the third stream of the expanded combustion gas and a portion of the second stream of the expanded combustion gas passing through the one or more flame stabilizers.

21 Claims, 5 Drawing Sheets

(56) References Cited

U.S. PATENT DOCUMENTS

| | | |
|---|---|---|
| 8,006,477 B2 | 8/2011 | Dinu |
| 2010/0126174 A1 | 5/2010 | Brinkmann et al. |
| 2011/0185739 A1 | 8/2011 | Bronson et al. |
| 2011/0219776 A1 | 9/2011 | Bunker et al. |
| 2012/0151935 A1* | 6/2012 | Bunker .................. F23R 3/005 60/774 |
| 2012/0260665 A1 | 10/2012 | Eroglu et al. |
| 2014/0352319 A1* | 12/2014 | Bunker .................... F02C 3/10 60/774 |

* cited by examiner

GAS TURBINE ENGINE AND METHOD OF OPERATING THEREOF

BACKGROUND

The disclosure relates generally to gas turbines engines, and in particular, to cooling of a reheat combustor in a gas turbine engine.

A conventional gas turbine engine includes a compressor for compressing air (sometime referred to as an oxidant as the air has oxidizing potential due to the presence of oxygen), which is mixed with fuel in a combustor and the mixture is combusted to generate a high pressure, high temperature gas stream, referred to as a post combustion gas. The post combustion gas is expanded in a turbine (high pressure turbine), which converts thermal energy from the post combustion gas to mechanical energy that rotates a turbine shaft.

Generally, during the process of combustion in the combustor, the oxygen content in the air is not fully consumed. As a result, the hot post combustion gas, exiting from the high pressure turbine, is associated with approximately 15% to approximately 18% by mass of oxygen and therefore has the potential of oxidizing more fuel. Some gas turbine engines, therefore, deploy a reheat combustor, where the post combustion gas is re-combusted after mixing with additional fuel. The re-combusted post combustion gas is expanded in another turbine section (low pressure turbine) to generate additional power. The deployment of the reheat combustor and the low pressure turbine therefore utilises the oxidizing potential of the post combustion gas, thereby increasing the efficiency of the engine.

The reheat combustors, however, during operation, possess a high demand for cooling air, which is generally provided by extracting a stream of air from the compressor. The extraction of air reduces the engine efficiency, as the stream of extracted air is unavailable for expansion in the high pressure turbine. The extraction of compressor air for cooling the reheat combustor therefore reduces the benefits of deploying the reheat combustor. Accordingly, a turndown or complete shutoff of the reheat combustion system may be desired. In a turndown situation, the engine may be requested to produce only a portion of its power, and may be turned down to as little as 20% of full load. A fixed flow area system (not modulated) would lead to unacceptable losses in power since the reheat cooling flow would remain at a fixed percentage of the total flow regardless of the firing conditions. In turn, this would severely restrict the range of firing temperatures, emissions compliance, complete fuel burning, and turn-down.

In addition, in a reheat combustor including an open centerline, hot combustion gasses are able to access an upstream intermediate pressure turbine (IPT) rear frame (diffuser). In a reheat combustor of this design, flame stabilization devices are typically cantilevered from the outer radius inward, which leads to cooling issues for the flame stabilization devices. Typically, cooling air will need to be injected through the flame stabilization devices, exiting into the hot combustion gases. This open centered design creates an imaginary flow boundary through symmetry, such that hot gases will be recirculated in a toroidal cell on the centerline. This flow pattern will circulate hot gas back to the IPT rear frame structure, causing an increased active cooling need for that structure and present hot gas issues circulating around the entire surface of the flame stabiliser. The unsteady nature of the recirculation zone will additionally present issues for the combustor's overall stability.

It is therefore desirable to have an alternate method to cool a reheat combustor without adversely affecting the engine efficiency.

BRIEF DESCRIPTION

These and other shortcomings of the prior art are addressed by the present disclosure, which a method for operating a gas turbine engine.

One aspect of the present disclosure resides a gas turbine engine comprising: a compressor for compressing air; a combustor for generating a post combustion gas by combusting a compressed air exiting from the compressor; a first turbine for expanding the post combustion gas; a splitting zone; a reheat combustor for combusting the first stream of the expanded combustion gas; and a pressure loss device for developing a pressure differential between the second stream and the third stream. The splitting zone includes one or more aerodynamically shaped flow diverters configured to split the expanded combustion gas exiting from the first turbine into a first stream, a second stream and a third stream. An outer liner and one or more flame stabilizers of the reheat combustor are cooled using the second stream of the expanded combustion gas and an inner liner of the reheat combustor is cooled using the third stream of the expanded combustion gas and a portion of the second stream of the expanded combustion gas exiting the one or more flame stabilizers.

Another aspect of the present disclosure resides in a method for operating a gas turbine engine comprising: compressing an air stream in a compressor; generating a post combustion gas by combusting a compressed air stream exiting from the compressor in a combustor; expanding the post combustion gas in a first turbine; splitting an expanded combustion gas exiting from the first turbine using one or more aerodynamically shaped flow diverters configured to split the expanded combustion gas into a first stream, a second stream and a third stream; combusting the first stream of the expanded combustion gas in a reheat combustor; cooling an outer liner and a flame stabilizer of the reheat combustor using the second stream of the expanded combustion gas; and cooling an inner liner of the reheat combustor using the third stream of the expanded combustion gas and a portion of the second stream of the expanded combustion gas passing through the one or more flame stabilizers.

Yet another aspect of the disclosure resides in a method for operating a gas turbine engine comprising: splitting a flow of an expanded combustion gas from a first turbine into a first stream, a second stream and a third stream using one or more aerodynamically shaped flow diverters; combusting the first stream of the expanded combustion gas in a reheat combustor; cooling an outer liner and one or more flame stabilizers of the reheat combustor using the second stream of the post combustion gas; and cooling an inner liner of the reheat combustor using the third stream of the post combustion gas and a portion of the second stream of post combustion gas passing through the one or more flame stabilizers.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the terms "first", "second", or the like are intended for the purpose of orienting the reader as to specific components parts.

Moreover, in this specification, the suffix "(s)" is usually intended to include both the singular and the plural of the term that it modifies, thereby including one or more of that term (e.g., "the opening" may include one or more openings, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As discussed in detail below, embodiments of the present disclosure provide a reheat combustor with cooling and method for cooling a reheat combustor of a gas turbine engine. This disclosure may, however, be embodied in many different forms and should not be construed as limited to the embodiments set forth herein; rather these embodiments are provided so that this disclosure will be thorough and complete and will fully convey the scope of the disclosure to those skilled in the art.

Figure 1:
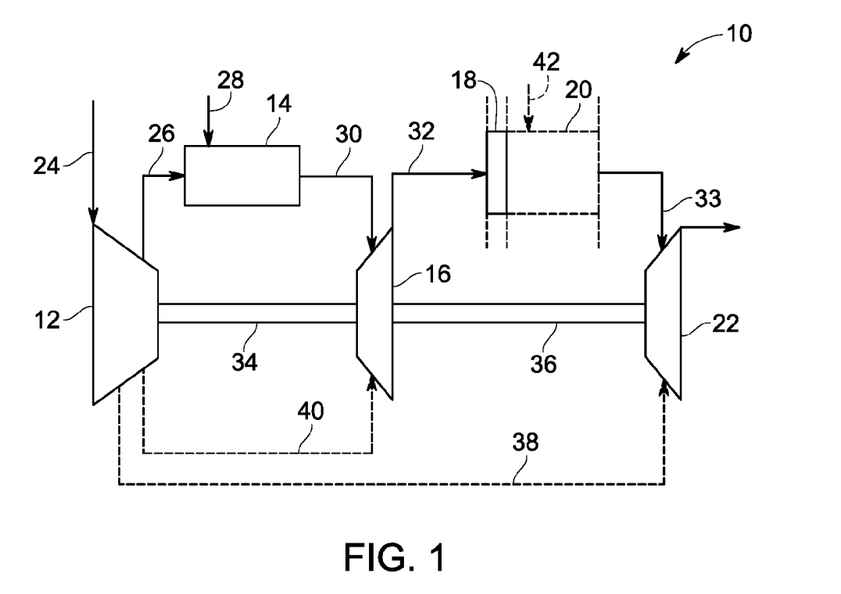
FIG. 1 schematically illustrates a gas turbine engine in accordance with one or more embodiments shown or described herein.

FIG. 1 illustrates a gas turbine engine 10 in accordance with an embodiment of the disclosure. The FIG. 1 illustrates a compressor 12, a combustor 14, a first turbine 16, a splitting zone 18, reheat combustor 20, and a second turbine 22. An air stream 24 comprising atmospheric air is fed into the compressor 12 for compression to the desired temperature and pressure. After compression, the air stream 24 exits the compressor 12 as a compressed air stream 26 and is mixed with a fuel stream 28 in the combustor 14. The mixture is ignited (combusted) in the combustor 14 resulting in a high temperature, high pressure stream of a post combustion gas 30. The post combustion gas 30 is expanded in the first turbine 16 to convert thermal energy associated with the post combustion gas 28 into mechanical energy and exits the first turbine 16 as an expanded combustion gas 32. In an embodiment, the first turbine 16 is comprised of a high pressure turbine (HPT) and an intermediate pressure turbine (IPT), where the exiting flow is the gas 32. In an alternate embodiment, the first turbine 16 is comprised of a high pressure turbine only. According to an embodiment, the first turbine 16 is coupled to the compressor 12 via a shaft 34 and drives the compressor 12.

The expanded combustion gas 32 is associated with certain amount of unutilized heated oxygen (about 15% to about 18% by mass). Therefore, instead of releasing the expanded combustion gas 32 in the atmosphere, the gas turbine engine 10 deploys the reheat combustor 20 and the second turbine 22 to generate additional power. According to an embodiment, prior to entering the reheat combustor 20, the expanded combustion gas 32 is routed through the splitting zone 18, where the expanded combustion gas 32 is split, using one or more aerodynamically shaped flow diverters, into three streams (illustrated in subsequent figures). A first stream of the expanded combustion gas 32 is combusted in the reheat combustor 20, whereas a second stream of the expanded combustion gas 32 is utilized for cooling an outer liner (described presently) of the reheat combustor 20 and a flame stabilizer (described presently) within the reheat combustor 20. A third stream of the expanded combustion gas 32 is utilized for cooling an inner liner (described presently) of the reheat combustor 20. In addition, a portion of the second stream of the expanded combustion gas 32, subsequent to passing through a flame stabilizer, is utilized for cooling the inner liner of the reheat combustor 20, and in an embodiment, a hottest portion of the inner liner in a flame zone. Details of the splitting zone 18 and the splitting of the expanded combustion gas 32 are further discussed in conjunction with subsequent figures. In an embodiment, after utilized for cooling, the second stream of the expanded combustion gas 32 and the third stream of the expanded combustion gas 32 may be mixed with the combusted first stream in the reheat combustor 20 and the mixture is fed into the second turbine 22 as a flow 33. It should be noted herein that the second stream of the expanded combustion gas 32 and the third stream of the expanded combustion gas 32, after being used for cooling of the reheat combustor 20, may partially or entirely participate in the combustion process within the reheat combustor 20. In an alternate embodiment, the combusted first stream 58 is fed into the second turbine 22 as a flow 33, and at least one of a portion of the second stream 60 of the expanded combustion gas 32 and a portion of the third stream 62 of the expanded combustion gas are used to cool the turbine 22, with or without the addition of a compressor air flow. The flow 33 is expanded in the second turbine 22 to generate power. In an embodiment, the second turbine 22 is coupled to the first turbine 16 by a shaft 36.

FIG. 1 also illustrates a stream of compressor air 38 and a stream of compressor air 40 drawn from various stages of the compressor 12 for cooling of the first turbine 16 and the second turbine 22, respectively. Alternatively, or in addition to, a portion of the second stream of expanded combustion gas 32 and/or a portion of the third stream of expanded combustion gas 32 may be used to cool the second turbine 22. Conventionally, during operation of a gas turbine engine, air is drawn from various stages of the compressor for cooling the various components such as the combustor, the reheat combustor and the high pressure and low-pressure turbines. The use of compressor air for cooling the various components results in a loss of efficiency of the conventional gas turbine engine as the compressor air fraction is utilized for cooling is unavailable for complete acceleration and expansion in the high-pressure turbine. It should be noted herein that such loss of efficiency in the conventional gas turbine engine is greatest for the compressor air used to cool the reheat combustor and the low-pressure turbine. The present disclosure proposes use of the expanded combustion gas 32 for cooling the reheat combustor 20, thereby decreasing the quantity of compressor air extracted for cooling purposes and improving the efficiency.

In an embodiment of the disclosure, one of the second stream of the expanded combustion gas 32 or the third stream of the expanded combustion gas 32 is mixed with a coolant 42 and the mixture is utilized for cooling the reheat combustor 20. In an alternate embodiment of the disclosure, both the second stream of the expanded combustion gas 32 and the third stream of the expanded combustion gas 32 are mixed with a coolant 42 and the mixture is utilized for cooling the reheat combustor 20. Coolant 42 may be introduced into the reheat combustor 20 by any suitable means. For example, coolant 42 may be introduced through a series of circumferentially spaced inlet nozzles placed downstream of the extraction location of expanded combustion gas 32, but upstream of one or more reheat combustor liner coolant injection holes (not shown in FIG. 1), such that expanded combustion gas 32 and coolant 42 have sufficient volume and time to mix. In a specific embodiment, the coolant 42 comprises compressor air. It should be noted that using some compressor air as coolant 42 along with a portion of the expanded combustion gas 32 for cooling still saves considerable amount of compressor air as compared to the conventional mechanism of cooling the reheat combustor solely by compressor air. In another embodiment, the coolant comprises steam.

In some embodiments, the temperature of the expanded combustion gas 32 is in a range of about 1500 degrees Fahrenheit to about 1600 degrees Fahrenheit. In a specific embodiment, the expanded combustion gas 32 is utilized for cooling the reheat combustor 20 such that the temperature of any metallic material of the reheat combustor 20 stays below 1700 degrees Fahrenheit or lower, for example. A reheat combustor gas 44 (shown in FIGS. 3 and 4) may have temperature in the range of 2200 to 3200 degrees Fahrenheit depending on the engine design and operating point. The amount and effectiveness of the cooling mechanisms will dictate the resulting material temperatures.

Figure 2:
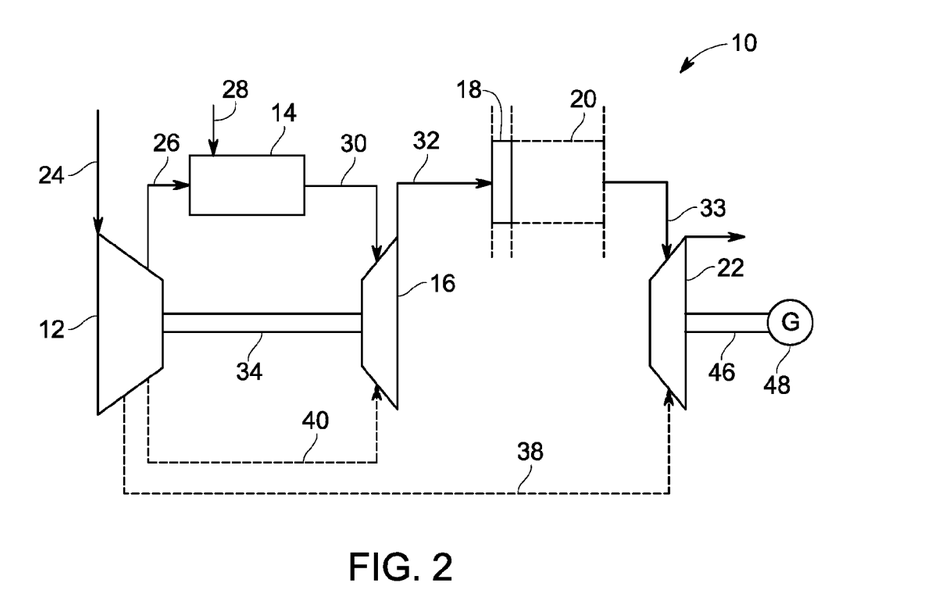
FIG. 2 schematically illustrates a gas turbine engine with an aerodynamic coupling between a first and second turbine in accordance with one or more embodiments shown or described herein.

FIG. 2 shows an alternate embodiment wherein the second turbine 22 is aerodynamically coupled to the first turbine 16 but on an independent shaft 46. In this embodiment, the first turbine 16 drives the compressor 12 and the second turbine 22 provides shaft power, for example to drive an electric power generator 48.

Figure 3:
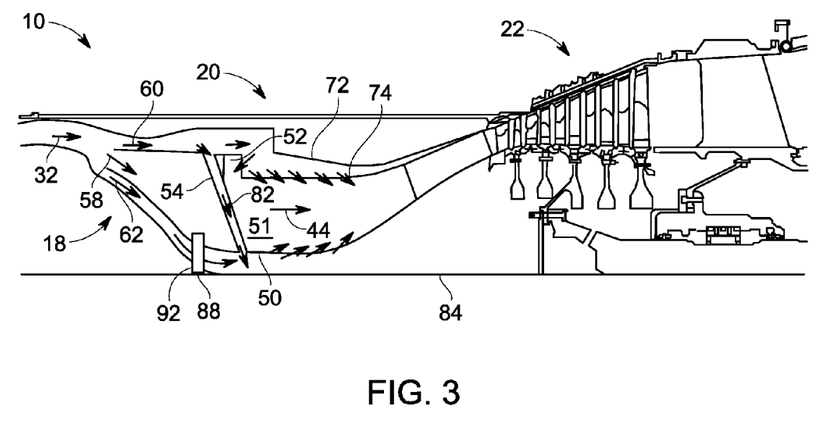
FIG. 3 schematically illustrates a reheat combustor of a gas turbine in accordance with one or more embodiments shown or described herein.
Figure 4:
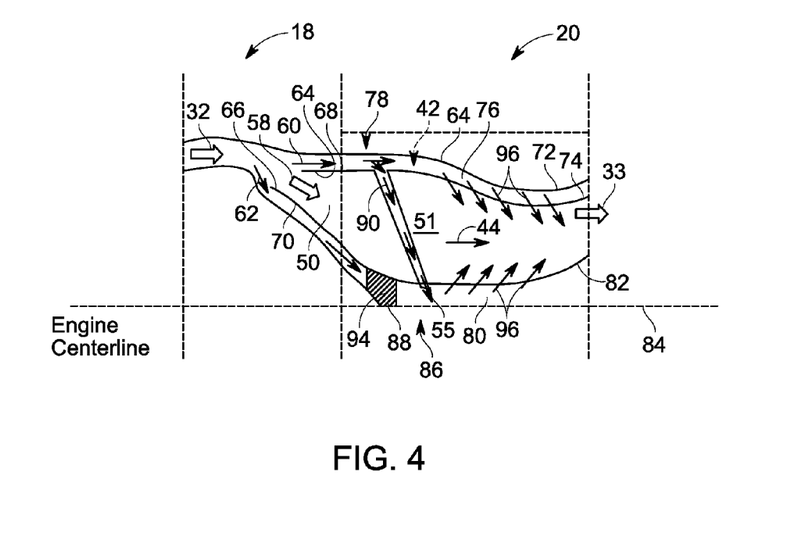
FIG. 4 schematically illustrates a splitting zone and a reheat combustor of a gas turbine engine in accordance with one or more embodiments shown or described herein.

FIG. 3 illustrates a schematic view of a portion of the gas turbine engine 10 including further details. More particularly, illustrated in FIG. 3 is the gas turbine engine 10 including reheat combustor 20 and second turbine 22. Reheat combustor 20, as illustrated, is configured generally annular in shape, about an engine centerline 84. The reheat combustor 20 is defined by an outer liner and inner liner (described presently) and includes a main chamber 50, defining a combustion zone 51, and a trapped vortex cavity 52. In an embodiment, the reheat combustor 20 does not include the trapped vortex cavity 52. One or more flame stabilization devices, referred to herein as one or more flame stabilizers 54, of which only one is shown in FIGS. 3 and 4, are disposed therein the reheat combustor 20, and more particularly spaced about the circumference of the annular reheat combustor 20 and extending across the main chamber 50 in the combustor zone 51, to provide improved combustion. Each of the one or more flame stabilizers 54 is disposed in a cantilevered position and extending from an outer radius of the reheat combustor 20, in an inward direction toward the engine centerline 84. The one or more flame stabilizers 54 require an active cooling flow to survive for any desirable length of time. As illustrated by directional flow arrows, an intermediate pressure turbine (IPT) oxidant exhaust flow, and more particularly the expanded combustion gas 32, is split into a first stream 58, a second stream 60 and a third stream 62 in the splitting zone 18.

FIG. 4 illustrates an enlarged view of the splitting zone 18 and the reheat combustor 20 of FIG. 3. It should be noted that FIG. 4 is illustrated without the inclusion of the trapped vortex cavity 52 as previously described. In the splitting zone 18, the expanded combustion gas 32 is split into the first stream 58, the second stream 60 and the third stream 62 using a diverter 64 and a diverter 66. The inclusion of diverters 64, 66 provide for turndown or complete shutoff of the reheat combustion system. As previously indicated, in a turndown situation, the engine 10 may be requested to produce only a portion of its power, and may be turned down to as little as 20% of full load. This turndown of power may be achieved through a combination of part load conditions in either or both the primary combustor 14 and/or the reheat combustor 20. In one instance, the reheat combustor 20 may be provided lower fuel-air ratios as known method of turning down power. To achieve turn down of the oxidant cooling air 32 for the reheat combustor 20, modulation of the cooling fluid flow rate, and more particularly the fluid flow rate of the second stream 60 and the third stream 62 of expanded combustion gas 32, to the outer liner 74, the inner liner 80, the vortex cavity 52 (when present) and the one or more flame stabilizers 54 is achieved by the diverters 64, 66. It should be noted the diverters 64, 66 are exemplary embodiments for splitting the expanded combustion gas 32. In another exemplary embodiment, the diverter system may not be limited to two diverters. In other words, there may be one or more such diverters, or a diverter system, deployed about a periphery of the reheat combustor 20.

According to an embodiment, the diverter 64 and the diverter 66 are positioned upstream of the reheat combustor 20. In a specific embodiment, the diverter 64 and the diverter 66 are coupled to the body of the reheat combustor 20 at a location 68 and a location 70, respectively, through hinge joints. The diverter 64 and the diverter 66 may be configured to achieve a desired position, or schedule, by translation, or by a combination of rotation and translation. In an embodiment, the diverter 64 and/or the diverter 66 rotate about the hinge joints at the location 68 and the location 70 and control the splitting of the flow of the expanded combustion gas 32 into the first stream 58, the second stream 60 and the third stream 62 as will be discussed in subsequent figures. As previously described, the first stream 58 constitutes the main flow to the reheat combustor 20 and undergoes combustion in the main chamber 50, and more particularly, within the combustion zone 51, of the reheat combustor 20. The second stream of the expanded combustion gas 32 is utilized for cooling an outer liner of the reheat combustor 20 and a flame stabilizer within the reheat combustor 20. The third stream of the expanded combustion gas 32 is utilized for cooling an inner liner of the reheat combustor 20.

As illustrated in FIGS. 3 and 4, in an embodiment, the reheat combustor 20 comprises a casing 72 and an outer liner 74. The reheat combustor 20, and more particularly the diverter 64 and the diverter 66 are configured to split the expanded combustion gas 32 in such a way that the second stream 60 of the expanded combustion gas 32 flows through a passage 76 between the casing 72 and the outer liner 74 of the reheat combustor 20, forming an outboard cooling circuit 78. In addition, the reheat combustor 20, and more particularly the diverter 64 and the diverter 66 are configured to split the combustion gas 32 in such a way that the third stream 62 of the expanded combustion gas 32 flows through a passage 80 between an inner liner 82 and an engine center line 84, forming a portion of an inboard cooling circuit 86.

The inboard cooling circuit 86, further includes a pressure loss device 88, disposed in, or positioned proximate, the passage 80, and configured to develop a pressure differential (dP) between the second stream 60 of expanded combustion gas 32 and the third stream 62 of expanded combustion gas 32. The development of this pressure differential between the second stream 60 and the third stream 62 allows for a portion 90 of the second stream 62 to flow through the one or more flame stabilizers 54 from outboard to inboard as a cooling flow, with no injection of the portion 90 of the second stream 62 into the flame, and more particularly, the combustion zone 51. To accomplish such, the one or more flame stabilizer 54 is configured to provide an outlet 55, for the portion 90 of the second stream 60 of the expanded combustion gas 32 passing therethrough, into the passage 80. In an embodiment, the pressure loss device 88 may be an inlet metering device 92 (FIG. 3), a blocking structure 94 (FIG. 4), or any other device capable of providing control of the pressure within the passages 76 and 80 and provide for the drawing of the portion 90 of the second stream 60 of the expanded combustion gas 32 through the one or more flame stabilizers 54.

The flow of the portion 90 of the second stream 60 of expanded combustion gas 32 through the one or more flame stabilizer 54 provides cooling to the one or more flame stabilizer 54. This active cooling of the one or more flame stabilizers 54 provides for an extension in life of the one or more flame stabilizer 54, yet eliminates any injection of the cooling flow into a central region of the combustion zone 50. In addition, the portion 90 of the second stream 60 of the expanded combustion gas 32 exiting the one or more flame stabilizer 54 at the outlet 55 and into passage 80 provides additional cooling to the inner liner 82.

As previously indicated, the second stream 60 of expanded combustion gas 32 is used to cool the outer liner 74 of the reheat combustor 20. It should be noted, in an embodiment, a portion of the second stream 60 of the expanded combustion gas 32 may be used to cool the trapped vortex cavity 52, where present. In addition, the third stream 62 of expanded combustion gas 32 and the portion 90 of the second stream 32 of expanded combustion gas 32 passing through the one or more flame stabilizer 54 is used to cool the inner liner 82 of the reheat combustor 20. The second stream 60 and the third stream 62 are used to cool the reheat combustor 20 through various mechanisms. In an embodiment, impingement cooling is employed, wherein the second stream 60 and the third stream 62 are impinged on the cold surfaces of the reheat combustor 20, that is the surface in contact with the second stream 60 and the third stream 62, respectively. In addition, impingement cooling is employed, wherein the portion 90 of the second stream 60 is impinged on the inner surface of the one or more flame stabilizer 54 that is the surface in contact with the portion 90 of the second stream 60. In another embodiment, effusion cooling or film cooling is employed, wherein the cooling streams, and more particularly the second stream 60 and the third stream 62 are injected through one or more injection holes 96 of the outer and inner liners 74, 82 to form a thin film cooling layer over the surface of the reheat combustor 20 that is bounded by the reheat combustion gases 44. It is to be noted that a combination of two or more mechanisms can also be employed to cool the reheat combustor 20 using the second stream 60 and the third stream 62.

After being utilized for cooling, in an embodiment, the second stream 60, the portion 90 of the second stream 60 passing through the one or more flame stabilizer 54 that exits into the passage 80, and the third stream 62, enter the main chamber 50 of the reheat combustor 20 as illustrated in the figure. The outer liner 74 of the reheat combustor 20 may include the injection holes 96, which facilitate the entry of the second stream 60 in the main chamber 50. The injection holes 96 may be used for dilution or film cooling purposes. In some embodiments, the inner liner 82 may include the injection holes 96. After entering the main chamber 50, the second stream 60 and the third stream 62 are mixed with the first stream 58 (undergoing combustion) and in the process a fraction of the second stream 60 and a fraction of the third stream 62 may also undergo combustion in the main chamber 50. The mixture of the combusted first stream 58, the second stream 58 (a part of which may have undergone combustion) and the third stream 62 (a part of which may have undergone combustion) leaves the reheat combustor 20 as the flow 33. The flow 33 is expanded in the second turbine 22 (illustrated in FIG. 1).

As previously indicated, in some embodiments, the second stream 60 and/or the third stream 62 may be mixed with the coolant 42 in their respective passage 76, 80 and the mixture is used to cool the reheat combustor 20. In a specific embodiment, the coolant 42 is air drawn from a stage of the compressor 12 (FIG. 1). In another embodiment, the coolant 42 is steam.

In an embodiment, the diverter 64 and diverter 66 are configured sectional in a circumferential direction (annulus) and may pivot about a mechanical base point or centroid (as described presently) to adjust or modulate an entry flow area for the expanded combustion gas 32 flow. The diverter 64 and diverter 66 are further configured aerodynamic in shape, having little to no lift capability. More specifically, the diverters 64 and 66 are aerodynamically configured so that the expanded combustion gas 32 flowing past the diverters 64 and 66 exerts a surface force on the diverters 64 and 66, but includes minimal force that is perpendicular to the oncoming flow direction, and known as the lift force. During operation, the pressure drops associated with first stream 58 through the main chamber 50, and the cooling flow second stream 60 and third stream 62 must be maintained in correct ratio. The flow of the second stream 60 and the third stream 62 are modulated primarily by adjustment of the flow area, and not by changes to pressure loss.

Figure 5:
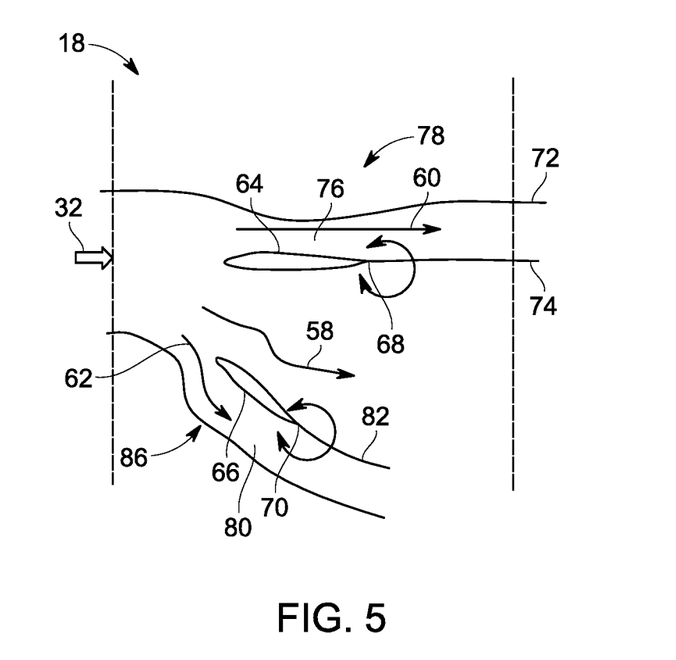
FIG. 5 illustrates a splitting zone having flow diverters in a fully open position in accordance with one or more embodiments shown or described herein.

To further describe the diverter 64 and the diverter 66, FIG. 5 illustrates schematically a further blown up view of the splitting zone 18. The splitting zone 18 comprises the diverter 64 and the diverter 66 positioned upstream of the reheat combustor 20 (FIG. 1). In the illustrated embodiment, the diverter 64 and the diverter 66 are coupled to the body of the reheat combustor 20 (illustrated in FIGS. 1 and 2) via hinge joints at the location 68 and the location 70, respectively. According to an embodiment, each of the diverters 64, 66 have an aerodynamic shape to minimize flow separations and associated pressure losses. The diverters 64, 66 split the flow of the expanded combustion gas 32 into the first stream 58, the second stream 58 and the third stream 62. The rotations of the diverters 64, 66 about respective hinge joints regulate the amount of the second stream 60 and the third stream 62 to be split from the post combustion gas 32 for cooling the reheat combustor 20 (illustrated in FIGS. 1, 2). FIG. 5 illustrates the diverters 64, 66 in a fully open position, which enables drawing of maximum mass of the second stream 60 via the passage 76 and the third stream 62 via the passage 80 from the expanded combustion gas 32. The greater the firing temperature of the reheat combustor 20, the greater is the cooling requirement for the reheat combustor 20. Therefore with increasing firing temperature of the reheat combustor 20, the opening of the passage 76 and the passage 80 is increased through rotation of the diverters 64, 66 so that an increasing amount of the second stream 60 and the third stream 62 can be drawn from the post combustion gas 32 for the cooling of the reheat combustor 20.

Figure 6:
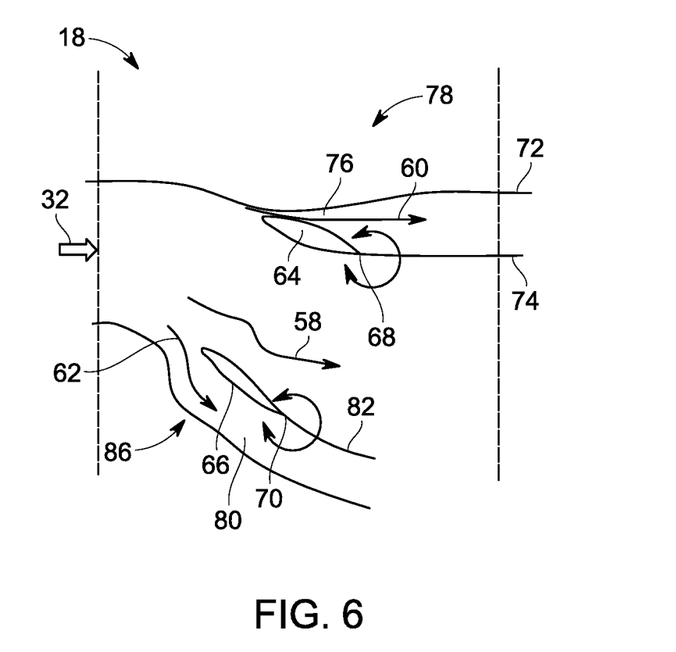
FIG. 6 illustrates a splitting zone having flow diverters in a partially open position in accordance with one or more embodiments shown or described herein.

FIG. 6 illustrates the splitting zone 18 with the diverters 64, 66 in a partially open position. As compared with the fully open position of the diverters 64, 66 in FIG. 5, the partially opened position reduces the opening of the passages 76, 80 for the flow of the second stream 60 and the third stream 62, respectively, thereby reducing the mass of the second stream 60 and the third stream 62 extracted from the expanded combustion gas 32. As the load demand on the turbine reduces, the cooling demand for the reheat combustor (FIG. 1) reduces and the diverters 64, 66 are rotated from a fully open position (FIG. 5) to the partially open position (FIG. 6).

Figure 7:
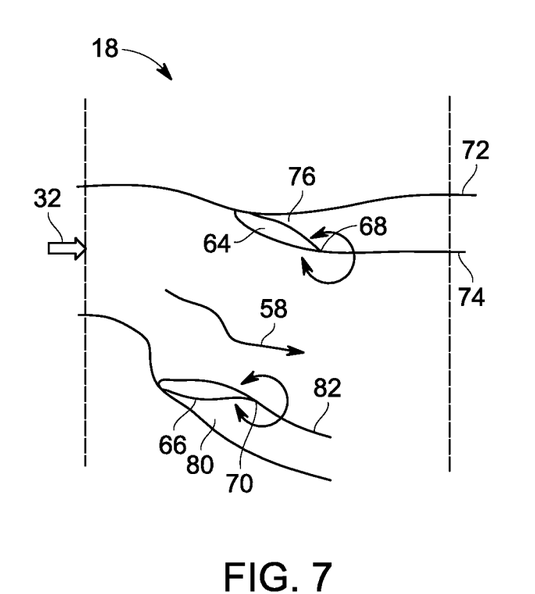
FIG. 7 illustrates a splitting zone having flow diverters in a closed position in accordance with one or more embodiments shown or described herein.

FIG. 7 illustrates the splitting zone 18 with the diverters 64, 66 in a closed position. As compared with the fully open position of the diverters 64, 66 illustrated in FIG. 5 and the partially open position illustrated in FIG. 6, the closed position allows only a small leakage cooling flow of the second stream 60 and the third stream 62 and almost all of the post combustion gas 32 enters the reheat combustor 20 (FIG. 1) as the first stream 58. The closure of the diverters 64, 66 would typically be when the reheat combustor 20 is not being fired, so no cooling flow is required. The diverters 64, 66 are usually kept in a closed position when there is no requirement for the reheat combustor 20 (FIG. 1) to combust the expanded combustion gas 32. In such a scenario there is no requirement for cooling of the reheat combustor 20 (FIG. 1) and hence no expanded combustion gas 32 is diverted as the second stream 60 and the third stream 62 (FIGS. 5 and 6) for cooling of the reheat combustor 20 (FIG. 1).

Figure 8:
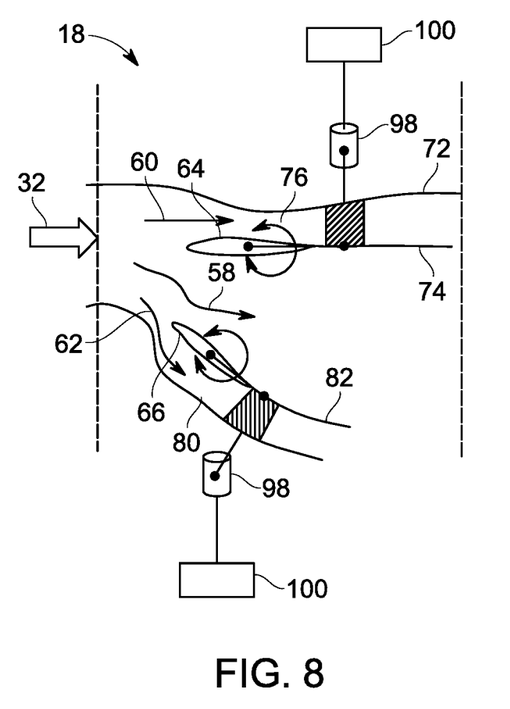
FIG. 8 illustrates a splitting zone having flow diverters coupled to a servomotor controlled by a controller in accordance with one or more embodiments shown or described herein.

FIG. 8 illustrates the splitting zone 18 with the diverter 64 and the diverter 66 coupled to a servomotor 98, which is controlled by a controller 100. The controller 100 controls the rotation of the diverter 64 and the diverter 66 via the servomotor 98, thereby regulating the flow through the passages 76, 80. In an embodiment, the actuation mechanism, and more particularly the servomotors 98, may be located inboard (nearer) or outboard (farther away), from a flow path of the first stream 58 with coupling to the diverter 64 and diverter 66 through one or more aerodynamic struts in the cooling flow off-take ducts, and more particularly passages 76 and 80. More specifically, embodiments require the servomotors 98 to be located outside of the flow of any hot gases, such as the combustor first stream 58, due to included electronics and intolerance to high temperatures. In an embodiment, the servomotor 98 is located in a cooling air region, such as within the passages 76, 80 near the second stream 60 and the third stream 62 or even further outboard such as exterior the casing 72.

The aerodynamically shaped flow diverters 64, 66 are configured to split the expanded combustion gas 32 based on an operating point of the gas turbine engine 10. The operating point can be a function of load demand, inlet air temperature, fuel type, or the like. In an embodiment, the controller 100 controls splitting of the expanded combustion gas 32 based on the load on the gas turbine engine 10 (FIG. 1), or the firing temperature of the reheat combustor 20, causing the diverter 64 and the diverter 66 to be in a fully open, partially open, or closed positions as discussed in conjunction with FIGS. 5, 6 and 7. This process of configuring the diverters 64 and 66 is commonly referred to as scheduling of the diverter positions. In a specific embodiment, the opening of the passages 76, 80 is adjusted by rotation of the diverters 64, 66 such that the second stream 60 and the third stream 62 are about 20% to about 45% by mass of the flow of the post combustion gas 32.

Figure 9:
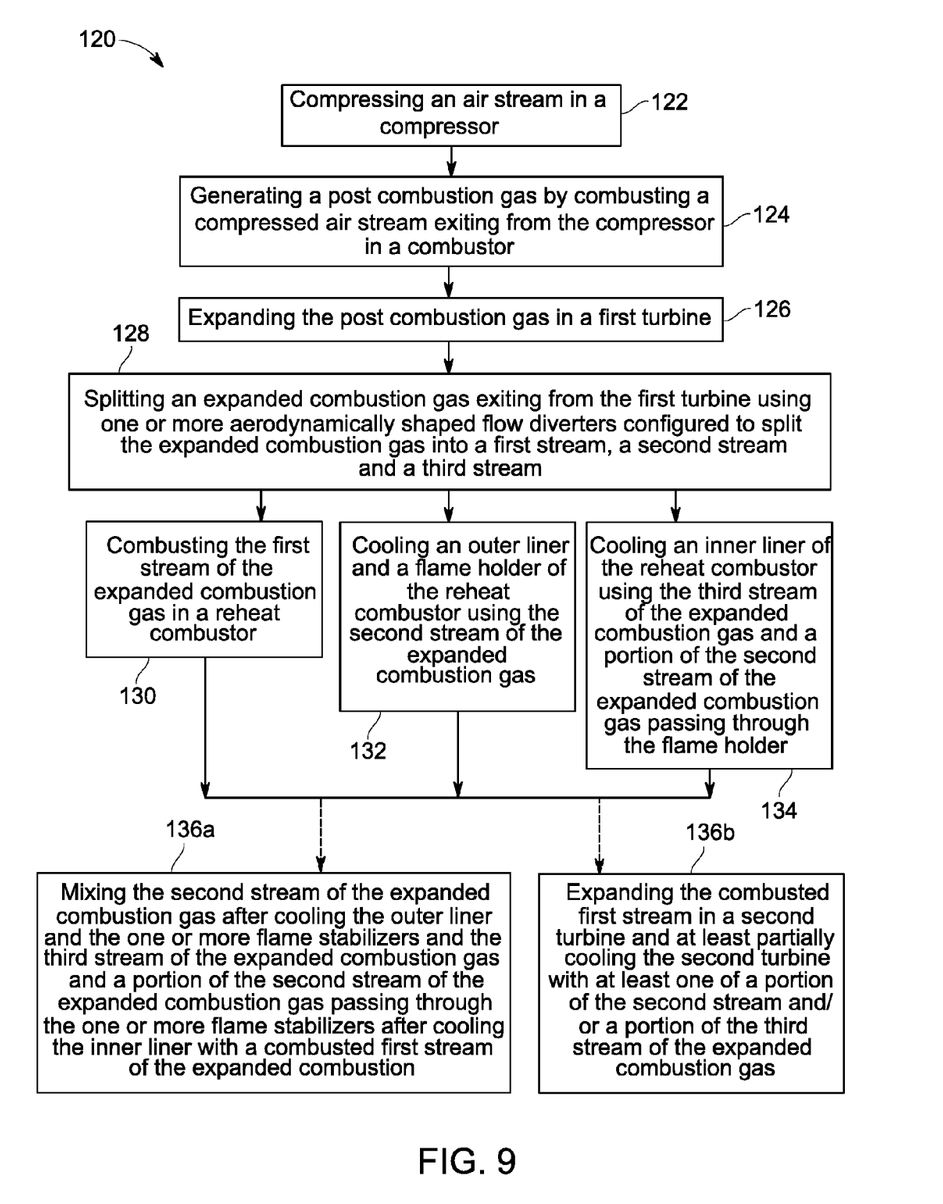
FIG. 9 schematically illustrates method a method for operating a gas turbine engine in accordance with one or more embodiments shown or described herein.

Referring now to FIG. 9, illustrated is a method 120 for cooling a reheat combustor 20 according to one or more embodiments. The method 120 includes compressing an air stream in a compressor, as step 122. Next, a post combustion gas is generated by combusting the compressed air stream exiting from the compressor in a combustor, as step 124. In a step 126, the post combustion gases are expanded in a first turbine. Subsequent to expansion, the expanded combustion gas exiting from the first turbine is split into a first stream, a second stream and a third stream, in step 128. More specifically, the expanded combustion gas exiting from the first turbine is split using one or more aerodynamically shaped flow diverters configured to split the expanded combustion gas into the first stream, the second stream and the third stream.

The first stream of the expanded combustion gas is combusted, in a step 130, in a main chamber of a reheat combustor. In a step 132, an outer liner and a flame stabiliser of the reheat combustor are cooled using the second stream of the expanded combustion gas. In a step 134, an inner liner of the reheat combustor is cooled using the third stream of the expanded combustion gas and a portion of the second stream of the expanded combustion gas passing through the one or more flame stabilizers.

In an embodiment, the method 120 further comprises, in a step 136a, mixing the second stream of the expanded combustion gas after cooling the outer liner and the one or more flame stabilizers of the reheat combustor with a combusted first stream of the expanded combustion gas of the reheat combustor and mixing the third stream of the expanded combustion gas and a portion of the second stream of the expanded combustion gas passing through the one or more flame stabilizers after cooling the inner liner of the reheat combustor with the combusted first stream of the expanded combustion gas of the reheat combustor. In an alternative embodiment, the method 120 further comprises, in a step 136b, expanding the combusted first stream of the reheat combustor in a second turbine and at least partially cooling the second turbine with at least one of a portion of the second stream of the expanded combustion gas and a portion of the third stream of the expanded combustion gas. The method 120 provides for an aerodynamically efficient cooling flow path for stable combustion.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A gas turbine engine, comprising:
    a compressor for compressing air;
    a combustor for generating a post combustion gas by combusting a compressed air exiting from the compressor;
    a first turbine for expanding the post combustion gas;
    a splitting zone including one or more aerodynamically shaped flow diverters configured to split an expanded combustion gas exiting from the first turbine into a first stream, a second stream and a third stream;
    a reheat combustor for combusting the first stream of the expanded combustion gas;
    a pressure loss device for developing a pressure differential between the second stream and the third stream, wherein an outer liner and one or more flame stabilizers of the reheat combustor are cooled using the second stream of the expanded combustion gas and an inner liner of the reheat combustor is cooled using the third stream of the expanded combustion gas and a portion of the second stream of the expanded combustion gas exiting the one or more flame stabilizers; and
    a second turbine for expanding a combusted first stream of expanded combustion gas from the reheat combustor.

2. The gas turbine engine of claim 1, wherein the splitting zone is configured to split the expanded combustion gas in such a way that the second stream of the expanded combustion gas flows through a passage between a casing and the outer liner of the reheat combustor and the third stream of the expanded combustion gas flows through a passage between an engine centerline and the inner liner of the reheat combustor.

3. The gas turbine engine of claim 1, wherein the pressure loss device comprises a device for developing a pressure differential between the second stream and the third stream so as to allow a portion of the second stream to be drawn through the one or more flame stabilizers and exit into the passage between the engine centerline and the inner liner of the reheat combustor and provide for cooling of the one or more flame stabilizers and the inner liner.

4. The gas turbine engine of claim 3, wherein the pressure loss device is one of an inlet metering device and a blocking structure.

5. The gas turbine engine of claim 1, wherein the one or more aerodynamically shaped flow diverters are positioned upstream of the reheat combustor.

6. The gas turbine engine of claim 1, wherein the one or more aerodynamically shaped flow diverters are mechanically coupled to the reheat combustor.

7. The gas turbine engine of claim 1, wherein the one or more aerodynamically shaped flow diverters are configured to split the expanded combustion gas based on an operating point of the gas turbine engine.

8. The gas turbine engine of claim 1, further comprising at least one servomotor for actuating the one or more aerodynamically shaped flow diverters to split the expanded combustion gas.

9. The gas turbine engine of claim 8, wherein actuating the one or more aerodynamically shaped flow diverters comprises positioning the one or more aerodynamically shaped flow diverters in a fully open, partially open, or a closed position.

10. The gas turbine engine of claim 1, wherein the second turbine is for expanding a mixture of a combusted first stream of expanded combustion gas from the reheat combustor, the second stream of expanded combustion gas and the third stream of expanded combustion gas.

11. The gas turbine engine of claim 1, wherein at least one of a portion of the second stream of expanded combustion gas and a portion of the third stream of expanded combustion gas provide at least partial cooling for the second turbine.

12. A method of operating a gas turbine engine, the method comprising:
    compressing an air stream in a compressor;
    generating a post combustion gas by combusting a compressed air stream exiting from the compressor in a combustor;
    expanding the post combustion gas in a first turbine;
    splitting an expanded combustion gas exiting from the first turbine using one or more aerodynamically shaped flow diverters configured to split the expanded combustion gas into a first stream, a second stream and a third stream;
    combusting the first stream of the expanded combustion gas in a reheat combustor;
    cooling an outer liner and one or more flame stabilizers of the reheat combustor using the second stream of the expanded combustion gas;
    cooling an inner liner of the reheat combustor using the third stream of the expanded combustion gas and a portion of the second stream of the expanded combustion gas passing through the one or more flame stabilizers; and
    expanding a combusted first stream of expanded combustion as from the reheat combustor using a second turbine.

13. The method of claim 12, wherein the second stream of the expanded combustion gas and the third stream of the expanded combustion gas, in combination are about 20% to about 45% by mass of the expanded combustion gas exiting from the first turbine.

14. The method of claim 12, wherein cooling comprises, cooling the outer liner and the one or more flame stabilizers of the reheat combustor using the second stream of the expanded combustion gas and cooling the inner liner of the reheat combustor using the third stream of the expanded combustion gas and a portion of the second stream of combustion gas passing through the one or more flame stabilizers, through at least one of impingement cooling, effusion cooling, and film cooling.

15. The method of claim 12, wherein the one or more aerodynamically shaped flow diverters are positioned upstream of the reheat combustor.

16. The method of claim 12, wherein the one or more aerodynamically shaped flow diverters are mechanically coupled to the reheat combustor.

17. The method of claim 12, wherein splitting an expanded combustion gas exiting from the first turbine includes actuating the one or more aerodynamically shaped flow diverters to split the expanded combustion gas using at least one servomotor.

18. The method of claim 17, wherein actuating the one or more aerodynamically shaped flow diverters comprises positioning the one or more aerodynamically shaped flow diverters in a fully open, partially open, or a closed position.

19. A method comprising:
    splitting a flow of an expanded combustion gas from a first turbine into a first stream, a second stream and a third stream using one or more aerodynamically shaped flow diverters;
    combusting the first stream of the expanded combustion gas in a reheat combustor;
    cooling an outer liner and one or more flame stabilizers of the reheat combustor using the second stream of the post combustion gas;
    cooling an inner liner of the reheat combustor using the third stream of the post combustion gas and a portion of the second stream of post combustion gas passing through the one or more flame stabilizers; and
    expanding a combusted first stream of expanded combustion gas from the reheat combustor using a second turbine.

20. The method of claim 19, wherein splitting a flow of the expanded combustion gas includes maintaining a balance of pressures of the first stream, the second stream and the third stream to achieve sufficient flow through the reheat combustor and to provide for cooling of the reheat combustor.

21. The method of claim 19, further comprising positioning the one or more aerodynamically shaped flow diverters in a fully open, partially open, or a closed position and metering a pressure differential between the second stream and the third stream with a pressure loss device to allow a portion of the second stream to be drawn through the one or more flame stabilizers and exit into a passage between the engine centerline and the inner liner of the reheat combustor and provide for cooling of the one or more flame stabilizers and the inner liner.

\* \* \* \* \*